United States Patent [19]
Gao et al.

[11] Patent Number: 5,919,428
[45] Date of Patent: *Jul. 6, 1999

[54] METHOD OF FORMING TUNGSTEN CARBIDE PARTICLES

[75] Inventors: Lin Gao, Piscataway; Bernard Kear, Whitehouse Station; Purnesh Seegopaul, Flemington, all of N.J.

[73] Assignee: Nanodyne Incorporated, New Brunswick, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/759,234

[22] Filed: Dec. 5, 1996

[51] Int. Cl.⁶ .................................................. C01B 31/34
[52] U.S. Cl. ............................................................ 423/440
[58] Field of Search .............................................. 423/440

[56] References Cited

U.S. PATENT DOCUMENTS

| | | | |
|---|---|---|---|
| 3,077,385 | 2/1963 | Robb | 423/440 |
| 3,471,284 | 10/1969 | St. Pierre | 423/440 |
| 4,172,808 | 10/1979 | Bohm et al. | 252/443 |
| 4,190,439 | 2/1980 | Gortsema | 423/440 |
| 4,460,697 | 7/1984 | Hara et al. | 501/87 |
| 4,664,899 | 5/1987 | Kimmel et al. | 423/440 |
| 5,372,797 | 12/1994 | Dunmead et al. | 423/430 |

FOREIGN PATENT DOCUMENTS

290859A1  6/1991  Germany .

OTHER PUBLICATIONS

Gao, L. and B. H. Kear, Low Temperature Carburization of High Surface Area Tungsten Powders, NanoStructured Materials, vol. 5, No. 5, pp. 555–569 (1995).

Gao, L. and B. H. Kear, Synthesis of Nanophase W and WC Powders From Ammonium Metatungstate, Proceedings of 1995 Int'l Conf. on Tungsten & Refract. Metals, pp. 247–257, MPIF, Princeton (1996).

Ribeiro, et al., Preparation and Surface Composition of Tungsten Carbide Powders with High Specific Surface Area, Chem. Mater. 1991, 3, 805–812, ©1991 American Chemical Society.

Yamamoto et al., Properties of Ultrafine Tungsten Carbide and Cemented Carbide by Direct Carburization, Proceedings of the 14th International Plan. Seminar (1997).

*Primary Examiner*—Wayne Langel
*Attorney, Agent, or Firm*—Wood, Herron & Evans, LLP

[57] ABSTRACT

Nanograined tungsten carbide particles are formed by a controlled, simultaneous reduction carburization reaction wherein the kinetics of the carburization and reduction reactions are controlled to permit simultaneous reduction and carburization. The kinetics are controlled by reacting a reduction carburization gas mixture, preferably hydrogen and carbon monoxide by slowly increasing the reaction temperature by controlling the rate of temperature increase. Preferably, the reaction temperature will be increased less than 25° C. per minute, preferably about 1–2 degrees per minute, which prevents the formation of stable, undesirable species such as $W_2C$, which in turn interferes with the reaction efficiency.

9 Claims, 1 Drawing Sheet

METHOD OF FORMING TUNGSTEN CARBIDE PARTICLES

BACKGROUND OF THE INVENTION

Tungsten carbide is used in a wide variety of products such as cutting tools, wear parts and mining drill bits. Its toughness and hardness makes it excellent for these applications. In order to improve the hardness of tungsten carbide, the grain size of the cabide should be as small as possible. It is known that nanograin-sized tungsten carbide powders can be produced by a combination reduction/carburization process. This permits the tungsten carbide to be used in very demanding applications.

The current process to manufacture nanophase tungsten carbide, as well as tungsten carbide cobalt composites typically involves several processing steps. Initially, the tungsten composition is subjected to a reductive decomposition, followed by a gas-phase carburization. This results in the formation of many stable intermediates such as substoichiometric tungsten carbides, elemental tungsten and tungsten dioxide. The stability of these intermediate products significantly increases the carburization cycle time.

SUMMARY OF THE INVENTION

The present invention is premised on the realization that the rate of formation of tungsten carbide from tungsten precursor compositions is significantly improved by preventing the formation of many intermediate compositions, and forming the tungsten carbide in a one-step reaction.

More particularly, the present invention is premised on the realization that by reacting a tungsten-based composition with a gaseous mixture of hydrogen and a carbon source gas such as carbon monoxide one can form tungsten carbide directly, without the formation of the stable intermediates. This is more particularly accomplished by very carefully increasing the temperature of the reactants so that as the hydrogen reduces a tungsten atom, a carbon atom is present to immediately react to form tungsten carbide without forming the intermediate tungsten metal or substoichiometric tungsten carbide. The rate of reaction, in turn, is controlled very carefully by controlling the rate of heat increase up to about 700° C. The objects and advantages of the present invention will be further appreciated in light of the following detailed descriptions and drawings in which:

DETAILED DESCRIPTION

Figure 1:
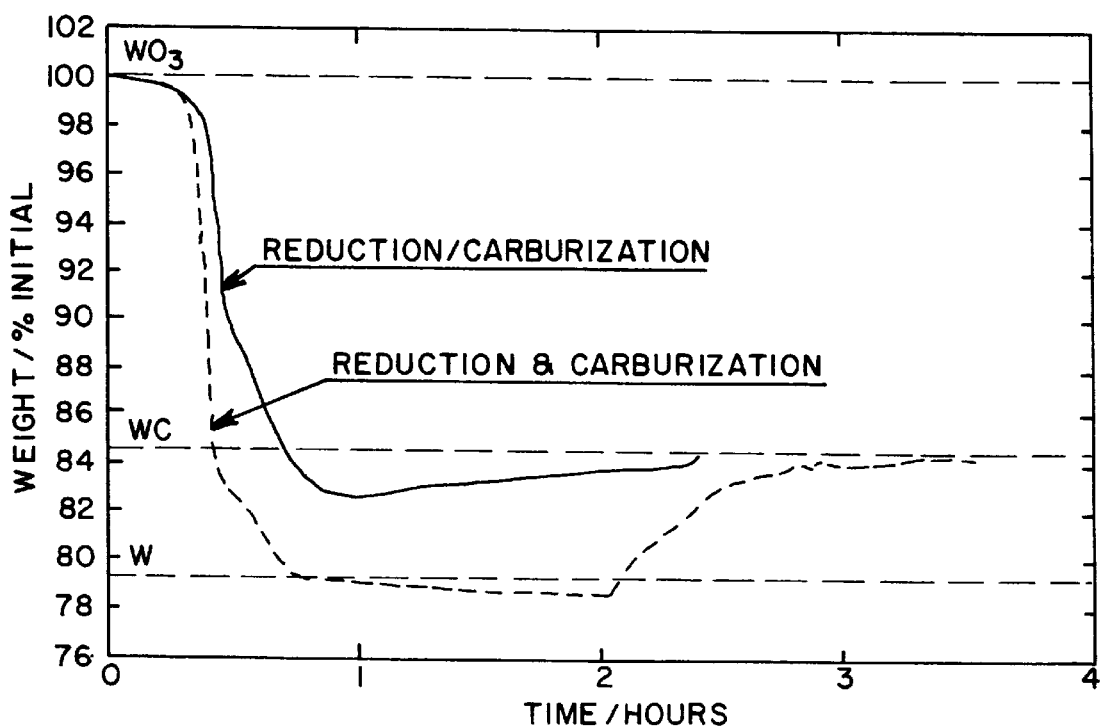
FIG. 1 is a thermogravimetric curve showing the one-step reduction carburization process of the present invention, compared to a conventional two-step reduction, then carburization process.

According to the present invention, tungsten carbide is formed from precursor compounds using a single-step reduction/carburization process. The precursor compounds can be basically any tungsten compound which can be reduced to form WC. Suitable tungsten compounds include ammonium metatungstate, ammonium paratungstate, tungsten blue oxide, standard yellow tungsten oxide, as well as tungsten dioxide and tungstic acid.

These are generally purchased as powder. Particle size is not particularly critical for practicing the present invention and can be anywhere from a few microns or less up to 200–300 microns. However, a smaller particle size does facilitate reaction rate.

The precursor composition is reacted with a reactant gas mixture of hydrogen and a carbon source gas in a heated reactor.

Any heated reactor which enables one to control the atmosphere can be used for the present invention. The reactor can be a fixed bed reactor, a rotary kiln reactor, or a fluidized bed reactor. Since the reaction is a solid gas reaction, a rotary kiln reactor or a fluidized bed reactor are preferred since they greatly facilitate gas/solid mixing.

The carbon source gas of the reactant gas mixture can be any carbon-containing gas that is unstable in the temperature range, i.e., able to decompose to deposit carbon. Carbon monoxide is preferred. In this situation, the hydrogen acts as a reducing agent and the carbon monoxide is a source of carbon for the concurrent carburization.

Preferably, the volume ratio of hydrogen to carbon source gas will range from 1:1 to 3:1 with an equivolume mixture preferred.

The mixture should have a sufficiently high carbon activity so as not to interfere with the reaction kinetics. If the carbon activity is too high, free carbon will be formed. Accordingly, it is preferred that the carbon activity of the gas mixture be from about 1 to about 2, with about 1.3 being preferred.

The precursor compound, in combination with the reaction gas mixture, is then heated up to about 700° C. The rate of heat increase is critical for practicing the present invention. This rate must be slow enough that the tungsten in the precursor compound immediately upon reduction reacts with carbon presented by the carbon monoxide to form tungsten carbide without forming intermediate complexes such as substoichiometric carbides and elemental tungsten. Basically, the heat-up rate cannot exceed 25° C. per minute once the reaction process is in progress. This will effectively permit formation of tungsten carbide directly from tungsten without formation of the intermediate elemental tungsten or substoichiometric tungsten carbide. Preferably, the heat-up rate will be 1° to 5° C. per minute. Lower heat-up rates will function, but will take significantly longer times.

Generally, the reaction time will take from about 2 to about 6 hours, depending upon the reaction gas mixture, heat-up rate and batch size.

The invention will be further appreciated in light of the following detailed examples.

EXAMPLE 1

100 mg of $WO_3$ powder was heated to 700° C. in a gaseous mixture of $H_2$ and CO at a 2:1 volume ratio. The heat-up rate was maintained at 25° C./minute to get to temperature for a total processing time of 2.5 hours. FIG. 1 shows the TG curve of this one-step carburization process. The sample weight was reduced to a level slightly below the theoretical WC level followed by a weight gain back to the WC value. XRD confirmed the presence of phase pure WC with the grain size measured at ca. 9 nanometers by line broadening techniques. The intermediate plateau on the TG curve was caused by the formation of reduction intermediate $WO_2$. FIG. 1 also shows the profile of the conventional two-step process in which 100 mg of $WO_3$ powder was fully reduced to W by $H_2$ and then carburized by CO.

EXAMPLE 2

Figure 2:
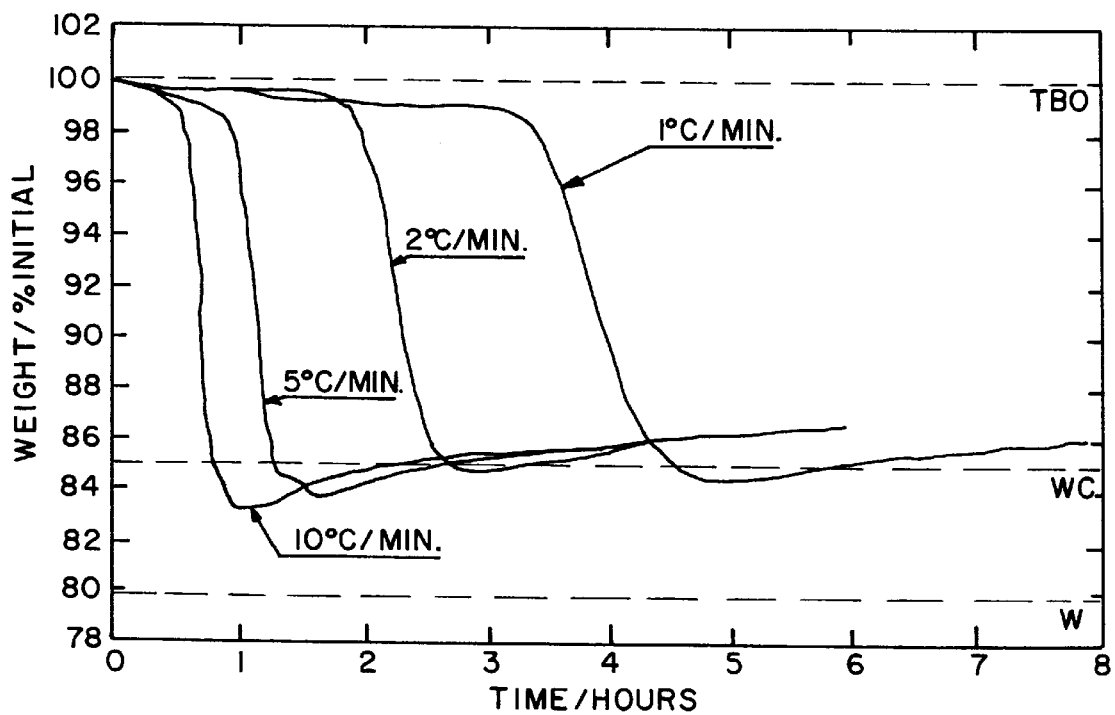
FIG. 2 is a thermogravimetric curve of the one-step process of the present invention over a series of heat-up rates.

100 mg of tungsten blue oxide (TBO) powder was heated to 700° C. in a gaseous mixture of $H_2$ and CO at a 2:1 volume ratio. The heating rate was varied to examine the reaction effects. FIG. 2 shows TG curves corresponding to the one-step carburization process at heatup rates of 10, 5, 2 and 1° C./min. It is clear that the $WO_2$ intermediate plateau is reduced as the heating rate becomes slower, with the resulting reduction in the deviation from the theoretical WC weight level. XRD confirmed the presence of phase-pure WC.

EXAMPLE 3

100 mg. of APT powder was heated to 700° C. in a gaseous mixture of $H_2$ and Co in a 2:1 ratio. The heat-up rate was maintained at 25° C./min. for a total processing time of 2 hours. XRD examination showed WC powders with an average grain size of ca. 10 nanometers, as measured by the line broadening technique.

EXAMPLE 4

600 mg of AMT powder was heated to 560° C. in a gaseous mixture of $H_2$ and CO in a 1:1 ratio. The heat-up rate was maintained at 25° C./minute to get to temperature for a total processing time of 6 hours. XRD confirmed the production of a phase-pure WC powder product. The BET surface area was measured at 16.35 $m^2/g$. This surface area value corresponds to a particle size of ca. 23 nanometers, under the assumption of a spherical nonagglomerated powder.

Thus the present invention provides a rapid method to produce nanograined tungsten carbide particles. By controlling the reaction kinetics of the reduction/carburization, one can form tungsten carbide directly without forming intermediate substoichiometric tungsten carbides or elemental tungsten, in turn greatly reducing the reaction time and improving the overall economics of the formation of tungsten carbide without, in any way, reducing the hardness or toughness of the formed product. The process time is reduced due to the absence of the substoichiometric $W_2C$ which is also an impurity.

This has been a description of the present invention along with preferred method of practicing the present invention. However, the invention itself should only be defined by the appended claims wherein we claim:

1. A method of forming nanograined tungsten carbide particles from a precursor compound selected from the group consisting of metatungstate, paratungstate, and tungstic acid comprising simultaneously reducing and carburizing said precursor compound by reacting said compound with a mixture of hydrogen and a carbon source gas, heating said precursor compound in the presence of said mixture at a rate controlled to prevent the formation of substoichiometric tungsten carbide and tungsten dioxide for a time effective to form tungsten carbide.

2. The method claimed in claim 1 wherein said precursor compounds are selected from the group consisting of ammonium metatungstate and ammonium paratungstate.

3. The method claimed in claim 1 wherein said heating rate is less than about 25° C. per minute.

4. The method claimed in claim 3 wherein said precursor is heated to a temperature of from about 540° C. to about 700° C.

5. The method claimed in claim 1 wherein said carbon source gas is carbon monoxide.

6. The method claimed in claim 5 wherein the gas mixture comprises a mixture of hydrogen and carbon monoxide at a volume ratio of 1:1 to 3:1.

7. The method claimed in claim 1 wherein said precursor is heated in a reactor selected from the group consisting of rotary kiln reactors and fluidized bed reactors.

8. The method of forming nanograin tungsten carbide particles from a precursor compound selected from the group consisting of metatungstates, paratungstate, and tungstic acid comprising, simultaneously reducing and carburizing said precursor compound by reacting said compound with a mixture of hydrogen and a carbon source gas;

heating said precursor compound in the presence of said mixture at a rate controlled to prevent formation of substoichiometric tungsten carbide and tungsten dioxide to a temperature less than about 700° C. for a time effective to form tungsten carbide.

9. The method claimed in claim 8 wherein said time is from about two to about six hours.

* * * * *